United States Patent
Ooiwa

(10) Patent No.: US 9,790,875 B2
(45) Date of Patent: Oct. 17, 2017

(54) EVAPORATIVE FUEL PROCESSING APPARATUS

(71) Applicant: DENSO CORPORATION, Kariya, Aichi-pref. (JP)

(72) Inventor: Hidetoshi Ooiwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/277,009

(22) Filed: Sep. 27, 2016

(65) Prior Publication Data

US 2017/0089275 A1 Mar. 30, 2017

(30) Foreign Application Priority Data

Sep. 30, 2015 (JP) .................................. 2015-194532

(51) Int. Cl.
F02D 41/00 (2006.01)
F02D 41/26 (2006.01)
F02M 25/08 (2006.01)
B01D 53/04 (2006.01)

(52) U.S. Cl.
CPC ....... *F02D 41/004* (2013.01); *B01D 53/0407* (2013.01); *F02D 41/26* (2013.01); *F02M 25/089* (2013.01); *F02M 25/0836* (2013.01); *B01D 2257/702* (2013.01); *B01D 2259/4516* (2013.01); *F02D 41/0042* (2013.01); *F02D 2200/021* (2013.01); *F02D 2200/04* (2013.01); *F02D 2200/0406* (2013.01)

(58) Field of Classification Search
CPC ..... F02D 41/004; F02D 41/26; F02M 25/089; B01D 53/0407
USPC ............. 123/520, 516, 518, 519, 198 D, 533
See application file for complete search history.

(56) References Cited

U.S. PATENT DOCUMENTS

| | | | |
|---|---|---|---|
| 6,138,644 A | 10/2000 | Saruwatari et al. | |
| 6,196,202 B1 | 3/2001 | Busato et al. | |
| 2015/0285170 A1* | 10/2015 | Nanba .................. | F02D 41/004 123/520 |
| 2015/0345411 A1* | 12/2015 | Ooiwa .................. | F02D 41/004 123/520 |
| 2016/0258390 A1* | 9/2016 | Makino .............. | F02M 25/0836 |

* cited by examiner

*Primary Examiner* — Mahmoud Gimie
(74) *Attorney, Agent, or Firm* — Nixon & Vanderhye P.C.

(57) ABSTRACT

An evaporative fuel processing apparatus executes a purge process when a predetermined purge condition is satisfied. A precondition, which is satisfied immediately before the satisfaction of the purge condition, is set. An operation of a purge pump is started at the time of satisfying the precondition. Thereafter, when the purge condition is satisfied, the purge valve is opened to execute the purge process. In this way, the time required for the purge pump to reach a rated rotational speed upon satisfaction of the purge condition can be shortened. Thus, the operating time period of the purge pump can be shortened, and the response delay of the purge can be avoided. That is, it is possible to limit shortage of the purge amount caused by the response delay.

3 Claims, 2 Drawing Sheets

US 9,790,875 B2

EVAPORATIVE FUEL PROCESSING APPARATUS

CROSS REFERENCE TO RELATED APPLICATION

This application is based on and incorporates herein by reference Japanese Patent Application No. 2015-194532 filed on Sep. 30, 2015.

TECHNICAL FIELD

The present disclosure relates to an evaporative fuel processing apparatus that executes a purge process by guiding evaporative fuel, which is held by a canister, to an intake air passage of an internal combustion engine.

BACKGROUND

An evaporative fuel processing apparatus includes a canister, which holds evaporative fuel evaporated in a fuel tank, a purge passage, which guides the evaporative fuel held by the canister to an intake air passage, and an electric purge valve, which opens and closes the purge passage (see FIG. 1).

Lately, a negative suction pressure generated in the intake air passage tends to be reduced because of a reduction of a displacement of an internal combustion engine, a reduction of a rotational speed of the engine due high-gearing of a transmission, use of a supercharger for energy saving or the like. When the negative suction pressure is small, a purge amount of evaporative fuel guided from the canister to the intake air passage is reduced, and thereby the purge process is deteriorated.

In view of the above disadvantage, there is proposed a technique of pumping the evaporative fuel held by the canister to the intake air passage through an operation of an electric purge pump installed in the purge passage (see, for example, JP3589632B2 corresponding to U.S. Pat. No. 6,196,202B1).

Lately, in the case of, for example, a hybrid vehicle or an idling stop vehicle, an operation of the internal combustion engine tends to be limited for the purpose of energy saving or reduction of $CO_2$ emissions. Therefore, it is desirable to always guide evaporative fuel held in the canister to the intake air passage during the time of operating the engine. In such a case, the purge pump needs to be always operated during the time of operating the engine.

In order to meet this demand, it is desirable that the purge pump has a very long life and high endurance. This will result in an increase in the costs of the purge pump and also result in an increase in the electric power consumption due to the operation of the purge pump all the time during the time of operating the engine.

In order to address the above disadvantage, it is conceivable to drive the purge valve from a valve closing state to a valve opening state and starts an operation of the purge pump upon satisfaction of a predetermined purge condition. Specifically, as shown in FIG. 4, at the timing T, at which the purge condition is satisfied, the purge valve of normally closed type is turned on, and the purge pump is operated.

However, when the operation of the purge pump is started after the satisfaction of the purge condition, there will be a time lag from the time of starting the rotation of the purge pump to the time of reaching a rated rotational speed of the purge pump. Thereby, a response delay of the purge occurs. Furthermore, this response delay may cause a shortage of the purge amount of evaporative fuel.

The present disclosure addresses the above disadvantage. According to the present disclosure, there is provided an evaporative fuel processing apparatus that includes a canister, a purge passage, an electric purge valve, an electric purge pump and a control device. The canister holds evaporative fuel, which is evaporated in a fuel tank. The purge passage guides the evaporative fuel, which is held by the canister, to an intake air passage of an internal combustion engine. The electric purge valve is electrically driven to open and close the purge passage. The electric purge pump is installed in the purge passage and is electrically driven to pump the evaporative fuel from the canister to the intake air passage. The control device controls energization of the electric purge valve and energization of the electric purge pump. A condition for executing a purge process by opening the electric purge valve and driving the electric purge pump in a middle of operating the internal combustion engine is defined as a purge condition. A condition, which is satisfied before satisfaction of the purge condition in the middle of operating the internal combustion engine, is defined as a precondition. The control device starts an operation of the electric purge pump at a time of satisfying the precondition and opens the electric purge valve at a time of satisfying the purge condition.

BRIEF DESCRIPTION OF THE DRAWINGS

The drawings described herein are for illustration purposes only and are not intended to limit the scope of the present disclosure in any way.

DETAILED DESCRIPTION

Embodiments of the present disclosure will be described with reference to the accompanying drawings. The following embodiments are examples of the present disclosure, and the present disclosure should not be limited to the following embodiments.

First Embodiment

Figure 1:
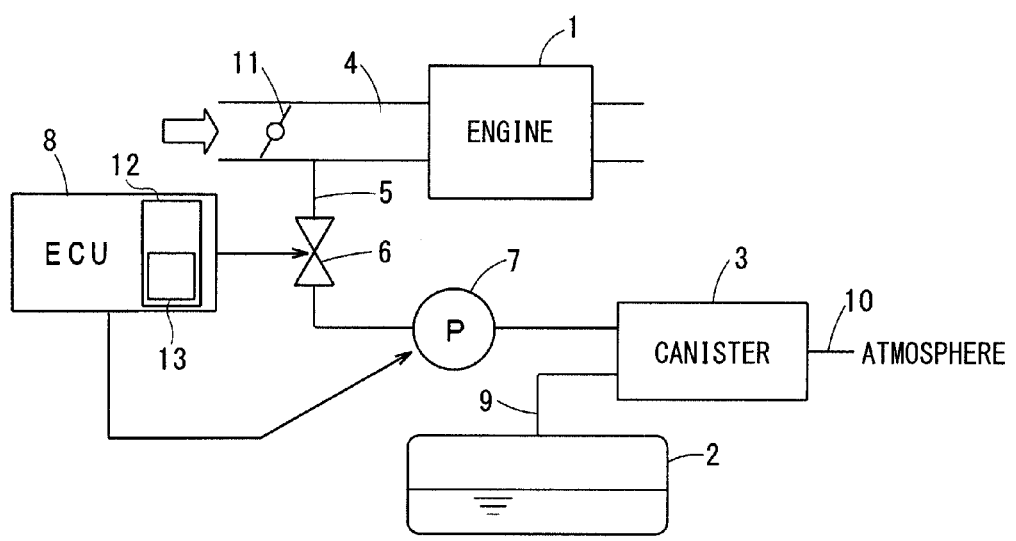
FIG. 1 is a schematic diagram indicating a structure of an evaporative fuel processing apparatus according to a first embodiment of the present disclosure.
Figure 2:
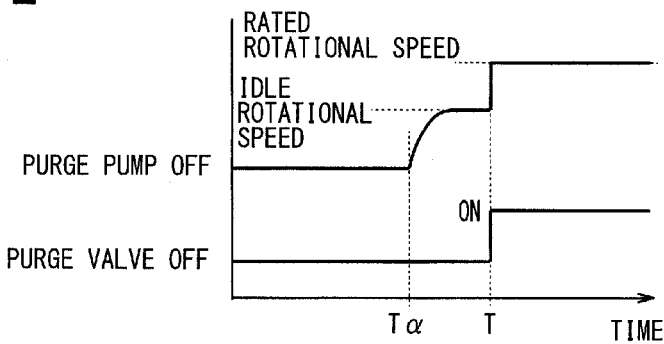
FIG. 2 is a time chart for describing an operation of a purge pump of the evaporative fuel processing apparatus according to the first embodiment.

A first embodiment will be described with reference to FIGS. 1 and 2.

An evaporative fuel processing apparatus is used in a vehicle, such as a hybrid vehicle, an idling stop vehicle, a conventional vehicle, which has an internal combustion engine (hereinafter simply referred to as an engine) 1 for driving the vehicle.

In the evaporative fuel processing apparatus, evaporative fuel (fuel vapors) generated in a fuel tank 2 is adsorbed and held by a canister 3, and a purge process is executed to guide the evaporative fuel, which is held in the canister 3, to an intake air passage 4 of the engine 1.

The evaporative fuel processing apparatus includes the canister 3 that adsorbs and holds the evaporative fuel, which is evaporated in the fuel tank 2.

The evaporative fuel processing apparatus includes a purge passage 5 that guides the evaporative fuel, which is held in the canister 3, to the intake air passage 4.

The evaporative fuel processing apparatus includes an electric purge valve (hereinafter simply referred to as a purge valve) 6 that is electrically driven to open and close the purge passage 5.

The evaporative fuel processing apparatus includes an electric purge pump (hereinafter simply referred to as a purge pump) 7 that is electrically driven to pump the evaporative fuel in the canister 3 to the intake air passage 4.

Energization of the respective electric functional components, which are used in the evaporative fuel processing apparatus, is controlled by an engine control unit (ECU) 8. The ECU 8 serves as a control device and controls the energization of at least the purge valve 6 and the purge pump 7.

The canister 3 is a vessel that receives an adsorbent material (e.g., activated carbon), which adsorbs and holds the evaporative fuel, in an inside of the vessel. Besides the purge passage 5 discussed above, a breather passage 9, which guides the evaporative fuel from the fuel tank 2 to the canister 3, is connected to the canister 3. A valve, such as a vent valve, a rollover valve, a cut off valve known in the art, is installed to a connection between the breather passage 9 and the fuel tank 2.

Atmospheric gases of the atmosphere can be introduced into the canister 3 through an atmospheric gas intake passage 10. A canister control valve (CCV), which has a solenoid valve structure, is installed to the atmospheric gas intake passage 10. When the CCV is opened, the atmospheric gases are taken into an inside of the canister 3.

The purge passage 5 communicates the inside of the canister 3 to a negative pressure generating range of the intake air passage 4. The negative pressure generating range is a range where a negative suction pressure, which is lower than the atmospheric pressure, is generated in the intake air passage 4.

The purge valve 6 is a solenoid valve of a normally closed type, which opens at the time of energization thereof and has a known structure. As shown in FIG. 2, an ON-OFF state of the purge valve 6 is controlled by the ECU 8. That is, turning on and off of the purge valve 6 is controlled by the ECU 8. The purge valve 6 is not limited to the valve, which is ON-OFF controlled (i.e., the valve that is controlled only between ON and OFF of the valve). For instance, the purge valve 6 may be a valve, an opening degree of which is controlled through, for example, a duty ratio control operation.

The purge pump 7 is an electric pump that includes an electric motor and a pump.

Although a type of the electric motor is not limited to any particular one, the electric motor may be a permanent-magnet synchronous motor or a synchronous reluctance motor.

Furthermore, although a type of the pump is not limited to any particular one, the pump may be any appropriate pump, such as a vane pump, a Wesco pump, or a centrifugal pump.

The ECU 8 is an electronic control device that uses a known computer. The ECU 8 controls fuel injection to control an operation of the engine 1.

The ECU 8 executes the purge process during the operation of the engine 1, so that evaporative fuel is drawn into the engine 1. At this time, the ECU 8 corrects an injection amount of fuel to be injected from the injector based on a purge amount of the evaporative fuel drawn into the engine 1 (the evaporative fuel guided into the intake air passage 4). A known technique is used as the technique of correcting the injection amount of fuel based on the purge amount of the evaporative fuel, and discussion of this technique is omitted for the sake of simplicity.

The ECU 8 has a purge function unit 12 that executes the purge process by opening the purge valve 6 and driving the purge pump 7 in the middle of operating the engine 1. A condition for executing the purge process by the ECU 8 in the middle of operating the engine 1 is defined as a purge condition. The purge condition is set such that the purge condition is satisfied at the best timing for starting the purge process.

In order to facilitate the understanding, an example of the purge condition will be described. The purge condition of this embodiment is set by a coolant temperature of the engine 1, a cumulative intake air amount (i.e., a cumulative value of the amount of intake air drawn into the engine 1), and a negative suction pressure generated in the intake air passage 4.

Specifically, in the present embodiment, the purge condition is satisfied upon satisfaction of all of the following conditions: the coolant temperature reaches a predetermined coolant temperature A° C.; the cumulative intake air amount reaches a predetermined amount; and the negative suction pressure becomes smaller than a predetermined negative pressure.

Furthermore, a condition, which is satisfied immediately before the satisfaction of the purge condition in the middle of operating the engine 1, is preset in the ECU 8. This condition is defined as a precondition.

The ECU 8 includes an advance operation function unit 13, which starts an operation of the purge pump 7 at the time of satisfying the precondition. This precondition is a condition that is satisfied immediately before (e.g., few seconds to few minutes before) the satisfaction of the purge condition described above and can be any condition.

In order to facilitate the understanding, an example of the precondition will be described. The precondition of the present embodiment is set by the coolant temperature of the engine 1. Specifically, the precondition is a corresponding coolant temperature that is 1° C. lower than the predetermined coolant temperature A° C. of the purge condition.

Specifically, in the present embodiment, the precondition is satisfied upon satisfaction of all of the following conditions: the coolant temperature reaches the corresponding coolant temperature that is 1° C. lower than the predetermined coolant temperature A° C.; the cumulative intake air amount reaches the predetermined amount; and the negative suction pressure becomes smaller than the predetermined negative pressure.

A rotational speed of the purge pump 7 at the time of satisfying the purge condition is defined as a rated rotational speed. The rated rotational speed may be a predetermined rotational speed or a rotational speed at the time of applying a rated drive current to the purge pump 7. The rated rotational speed is a rotational speed of the purge pump 7 that enables execution of the purge process even in a state where the negative suction pressure of the intake air passage 4 is small. In order to facilitate the understanding, an example of the rated rotational speed is about 40,000 rpm.

The advance operation function unit 13 of the first embodiment starts the operation of the purge pump 7 at a rotational speed that is lower than the rated rotational speed when the precondition is satisfied. Hereinafter, the rotational speed, which is set to be lower than the rated rotational speed, will be referred to as an idle rotational speed. The idle rotational speed may be a predetermined rotational speed. Alternatively, the idle rotational speed may be a rotational speed of the purge pump 7 at the time of supplying a predetermined small drive electric current to the purge pump 7. The idle rotational speed is set to a rotational speed of the purge pump 7 that is achieved with the small drive electric current and can be quickly increased to the rated rotational speed of the purge pump 7 when the operation of the purge pump 7 is switched to the operation at the rated rotational speed. In order to facilitate the understanding, an example of the idle rotational speed will be described. Specifically, the idle rotational speed may be set to about 1/10 of the rated rotational speed. That is, the idle rotational speed of the present embodiment is set to be in a range of 3,000 rpm to 5,000 rpm.

As discussed above, the ECU 8 starts the operation of the purge pump 7 when the precondition is satisfied in the middle of operating the engine 1. Thereafter, the ECU 8 opens the purge valve 6 when the purge condition is satisfied.

An example of the control operation of the ECU 8 for controlling the purge valve 6 and the purge pump 7 will be described with reference to a time chart of FIG. 2.

When the precondition is satisfied upon starting of the operation of the engine 1, the ECU 8 starts the operation of the purge pump 7 at the idle rotational speed at the timing Tα, at which the precondition is satisfied.

Thereafter, when the purge condition is satisfied, the ECU 8 opens the purge valve 6 by turning on the purge valve 6 and at the same time drives the purge pump 7 at the rated rotational speed (i.e., changes the rotational speed of the purge pump 7 from the idle rotational speed to the rated rotational speed).

First Advantage of First Embodiment

In the evaporative fuel processing apparatus of the first embodiment, the purge pump 7 is driven at the idle rotational speed when the precondition is satisfied. Then, the purge pump 7 is driven at the rated rotational speed when the purge condition is satisfied. In other words, the purge pump 7 is not driven until the precondition is satisfied. In this way, the operating time period of the purge pump 7 can be shortened. Thus, the required endurance performance, which is required for the purge pump 7, can be lowered.

As a result, even when the required endurance performance of the purge pump 7 is lowered, the sufficient long life of the purge pump 7 can be achieved. That is, it is possible to provide the evaporative fuel processing apparatus having the long life while the costs of the purge pump 7 are limited (or minimized).

Second Advantage of First Embodiment

The evaporative fuel processing apparatus of the first embodiment can shorten the operating time period of the purge pump 7, as discussed above. Therefore, the electric power consumption of the purge pump 7 can be limited (or minimized). In this way, the energy saving is possible, and the electric power generating load of the electric power generating system installed in the vehicle and the battery load of the battery installed in the vehicle can be reduced (or minimized).

Third Advantage of First Embodiment

In the evaporative fuel processing apparatus of the first embodiment, the operation of the purge pump 7 is started at the time of satisfying the precondition before the time of satisfying the purge condition. In this way, the time required for the rotational speed of the purge pump 7 to reach the rated rotational speed upon satisfaction of the purge condition can be reduced (or minimized). Therefore, the response delay of the purge can be avoided, and it is possible to limit occurrence of shortage of the purge amount of evaporative fuel, which would be caused by the response delay.

Fourth Advantage of First Embodiment

In the evaporative fuel processing apparatus of the first embodiment, when the precondition is satisfied, the operation of the purge pump 7 at the idle rotational speed, which is lower than the rated rotational speed, is started. In this way, the amount of electric power consumption from the time of satisfying the precondition to the time of satisfying the purge condition can be limited (or minimized). That is, the rotational speed of the purge pump 7 can be quickly increased to the rated rotational speed at the time of satisfying the purge condition while limiting (or minimizing) the amount of electric power consumption.

Second Embodiment

Figure 3:
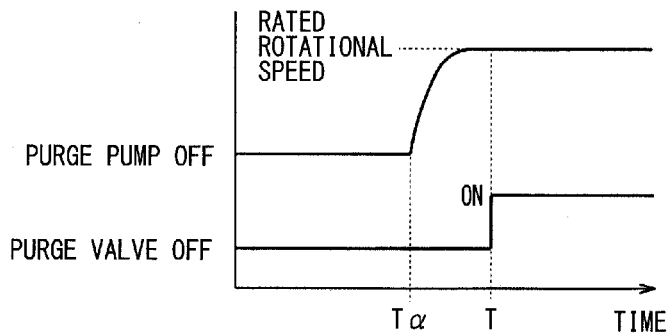
FIG. 3 is a time chart for describing an operation of a purge pump of an evaporative fuel processing apparatus according to a second embodiment of the present disclosure.
Figure 4:
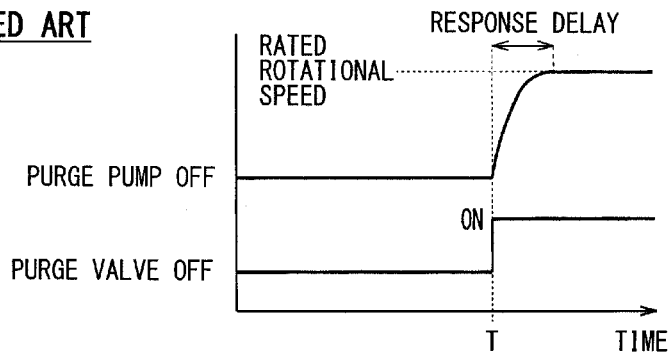
FIG. 4 is a time chart for describing an operation of a purge pump of a previously proposed evaporative fuel processing apparatus.

A second embodiment of the present disclosure will be described with reference to FIG. 3. In the following discussion, the reference signs, which are the same as those of the first embodiment, indicate the same elements as those of the first embodiment or elements, which are functionally equivalent to those of the first embodiment. Furthermore, in the following discussion, only the differences, which are different from the first embodiment, will be described. Thus, the portions or elements, which are not discussed in the second embodiment, are the same as those of the first embodiment.

The advance operation function unit 13 of the first embodiment starts the operation of the purge pump 7 at the idling rotational speed when the precondition is satisfied.

In contrast, the advance operation function unit 13 of the second embodiment starts the operation of the purge pump 7 at the rated rotational speed when the precondition is satisfied.

The exemplary operations of the purge valve 6 and the purge pump 7 according to the second embodiment will be described with reference to the time chart shown in FIG. 3.

When the precondition is satisfied upon starting of the operation of the engine 1, the ECU 8 starts the operation of the purge pump 7 at the rated rotational speed at the timing Tα, at which the precondition is satisfied.

Thereafter, when the purge condition is satisfied, the purge valve 6 is turned on at the timing T, at which the purge condition is satisfied.

First Advantage of Second Embodiment

Even with the above construction, advantages, which are substantially the same as those of the first embodiment, can be achieved. That is, the purge pump 7 can be operated at the rated rotational speed at the time of satisfying the purge condition, and thereby the response delay of the purge can be avoided.

Second Advantage of Second Embodiment

Furthermore, the rotational speed of the purge pump 7 is controlled only at the rated rotational speed. Therefore, the drive circuit of the purge pump 7 can be simplified. One example of this simplification of the drive circuit will be described. That is, the rotational speed control operation through, for example, the duty ratio control operation, can be eliminated, and the ON-OFF control operation of the purge pump 7 becomes possible.

Other Embodiments

In the above embodiments, the operation of the evaporative fuel processing apparatus is controlled by the ECU 8, which executes the engine control operation. However, the present disclosure should not be limited to this. That is, the operation of the evaporative fuel processing apparatus may be controlled by a control device that is independent from the ECU 8.

In the above embodiments, the function of the purge function unit 12 and the function of the advance operation function unit 13 are implemented by a corresponding control program(s). Alternatively, the function of the purge function unit 12 and the function of the advance operation function unit 13 may be implemented by hardware (e.g., a circuit) of the control device.

What is claimed is:

1. An evaporative fuel processing apparatus comprising:
a canister that holds evaporative fuel, which is evaporated in a fuel tank;
a purge passage that guides the evaporative fuel, which is held by the canister, to an intake air passage of an internal combustion engine;
an electric purge valve that is electrically driven to open and close the purge passage;
an electric purge pump that is installed in the purge passage and is electrically driven to pump the evaporative fuel from the canister to the intake air passage; and
a control device that controls energization of the electric purge valve and energization of the electric purge pump, wherein:
a condition for executing a purge process by opening the electric purge valve and driving the electric purge pump in a middle of operating the internal combustion engine is defined as a purge condition;
a condition, which is satisfied before satisfaction of the purge condition in the middle of operating the internal combustion engine, is defined as a precondition; and
the control device starts an operation of the electric purge pump at a time of satisfying the precondition and opens the electric purge valve at a time of satisfying the purge condition.

2. The evaporative fuel processing apparatus according to claim 1, wherein:
a rotational speed of the electric purge pump at the time of satisfying the purge condition is defined as a rated rotational speed; and
when the precondition is satisfied, the control device starts the operation of the electric purge pump at a rotational speed that is lower than the rated rotational speed.

3. The evaporative fuel processing apparatus according to claim 1, wherein:
a rotational speed of the electric purge pump at the time of satisfying the purge condition is defined as a rated rotational speed; and
when the precondition is satisfied, the control device starts the operation of the electric purge pump at the rated rotational speed.

* * * * *